UNITED STATES PATENT OFFICE 2,321,111

PROCESS FOR FORMING FOAM RUBBER AND PRODUCTS THEREOF

Paul Stamberger, Dover, Del., assignor to International Latex Corporation, Dover, Del., a corporation of Delaware No Drawing. Application January 16, 1941, Serial No. 374,710

14 Claims. (Cl. 260—723)

This invention relates to processes for forming foam rubber and products thereof, particularly products having an extremely fine and uniform cellular structure.

Among other purposes the invention is directed to the production of a latex mixture having the characteristics of a substantially liquid foam and adapted to the production of foam rubber articles or foam rubber coatings, by dipping a suitable form or the object to be coated, into a bath of the foam, so that when the form or article is withdrawn, it will carry a uniform layer of the fine foam, which layer, supplemented by further layers if desired, may then be suitably fixed and/or vulcanized.

Rubber latex without the addition of any foam stabilizing materials may be beaten into a temporarily stable froth or foam. However, such froth or foam collapses within about two hours and cannot be rebeaten to form the original, or other useful type of foam. That is, these foams are what may be termed "irreversible," as distinguished from what I will hereinafter term the "reversible" foams obtainable according to the present invention, and which may be rebeaten at least several times and readily restored to their very fine foamy condition, whenever they tend to become too coarse or partially collapsed.

Well-known processes are now available using frothed latex for making molded or poured articles, as distinguished from dipped articles, of cellular rubber material. Such frothed latex is poured shortly after it is prepared, into an enclosed molding space where setting or coagulation of the froth takes place either by the action of heat, in case a heat sensitive latex compound is used, or by reason of the previous addition to the latex of delayed action coagulants such as sodium silicofluoride. With such processes it is easy and customary to utilize all of the prepared froth within a short time, for example within about one-half hour, and hence no special care need be taken to keep the froth unchanged for any considerable time, and there is no occasion to rewhip any unused froth to restore the original consistency thereof.

For purposes other than molding, such irreversible froths or foams are not suitable and cannot be used in manufacturing articles or coatings by dipping forms into the foam. Instead, for such dipping processes it is necessary that a foam be maintained substantially unchanged for a considerable period of time to permit a form or an object to be gradually immersed in a bath of foam having the general characteristics of a liquid and then gradually withdrawn therefrom. This may take from 10 to 30 minutes, since the immersion must be at a rate slow enough to avoid carrying large air bubbles into the mass, and the withdrawal must be slow enough so that the coating will not "run" on the form after it is withdrawn. Also there must remain a considerable body of the substantially liquid foam from which the form is withdrawn, and when this remaining foam eventually becomes coarser or tends to collapse, to avoid its being wasted it must be of a "reversible" type, i. e., so that it may be rebeaten and restored to its original fine foamy condition. So far as I am aware, no latex foam satisfactorily meeting these requirements has heretofore been available.

The addition of materials which are known as stabilizers of foams in general, such as ammonium stearate, will increase very markedly the stability and volume of the foam obtainable upon beating liquid latex, and if no compounding ingredients are added, such as vulcanizing agents, accelerators and zinc oxide as important for vulcanization, this foam will exist for a considerable time without collapsing and can be rebeaten to the original condition. Yet in the presence of materials such as zinc oxide and accelerators, such foams will collapse in a short time, as from 2 to 4 hours, and cannot be rebeaten to the original state, and hence no useful foam product can be thereafter made therefrom.

I have discovered a method whereby the life of a latex foam, especially one which is compounded for vulcanization including zinc oxide and accelerators, may be increased and the foam made "reversible," so that when it has changed and become coarser, it may be brought back to its original state by rebeating. This may be accomplished by the combined use of chemical substances which I shall refer to as "anionic long chain compounds" and "cationic long chain compounds," both of which are added to the latex. Also by the addition of such compounds, extremely fine and uniform foams may be produced having the characteristics of liquids, and not "stiff," and thus well adapted for dipping processes.

By the expression "anionic long chain compounds," I have reference to substances which may be classed generally as colloidal electrolytes which dissociate in water to form positive ions, generally a metal or hydrogen ion, and negative ions which comprise a long hydrocarbon chain of at least 6 or more carbon atoms. By the expression "cationic long chain compounds," I have reference to substances which in general may be referred to as the converse of the anionic long chain compounds, that is, substances where the cation is comprised in the long hydrocarbon chain, the negative ion or ions then being a halide, sulphate or other anionic group.

Various other features, objects and advantages of the invention will be apparent from the following detailed description, and the invention resides in the novel steps and processes hereinafter described by way of examples, and also in the resulting products, as will be more particularly pointed out in the appended claims.

In accordance with my invention, I may form a rubber latex foam by beating or otherwise, from a latex in which the rubber is vulcanizable by sulphur or other chemical vulcanizing agent and is mixed with ingredients including an anionic long chain compound such as, for example, ammmonium stearate, and a cationic long chain compound such as stearyl trimethyl ammonium bromide. Ammonium stearate and stearyl trimethyl ammonium bromide are mentioned by way of example, it will be noted, and not by way of limitation. The anionic and cationic substances are in proportions such that the resulting latex is negatively charged and the foam produced is reversible, is capable of withstanding drying while maintaining a fine porous structure, and is sufficiently fluid to be poured. This foam may then be applied to an article to be coated. It may then be dried and vulcanized.

In preparing the latex mixture according to my invention, the latex may be first centrifuged if desired to obtain a suitable solid content, after which the usual compounding ingredients such as zinc oxide, a dispersion of sulphur as a vulcanizing agent, and vulcanization accelerators may be added, together with the "anionic" and "cationic long chain compounds." In some cases it may be preferred to use prevulcanized latex in the mixture.

Suitable "anionic long chain compounds" for the purpose, among others, may comprise ordinary soap substances, or soap-like materials, viz,. compounds containing a long hydrocarbon chain with a hydrophilic "head," the anion containing the long hydrocarbon chain and being the part of the molecule which contributes the surface-active properties. More specifically, one may use the usual alkali or ammonium salts of palmitic, stearic and oleic acids. Substances containing the carboxyl group may be replaced if desired by other substances containing hydrophilic groups such as the sulpho, amino, hydroxyl, etc. Also one may use certain synthetic products which are widely known in the textile industry as assistants, such as wetting, softening and emulsifying agents, for example a material known under the trade name of Igepon T, which is a sodium salt of oleyl methyl taurine; also a material known under the trade name of Nekal A, which is a sodium alkyl naphthalene sulphonate, wherein the alkyl is a long chain radical such as oleyl, with sodium the positive ion and the remainder negative; trihydroxy ethylamin stearate; also materials available under the trade name of Duponols, which are sulphates of higher alcohols as lauryl alcohol or oleyl alcohol. In this latter case the sulphate of a higher alcohol, such as lauryl sulphate, is broken up or dissociated into positive hydrogen ions (or the positive ion is a metal if a salt is used), and the combination of the lauryl with the sulphate radical is negatively charged.

In the "cationic long chain compounds," the hydrophilic "head" to which the long chain is attached, is a positive group such as a quaternary ammonium, sulphonium or phosphonium group. Specific examples of available "cationic long chain compounds" for the purpose may include cetyl pyridinium bromide, commercially available under the trade name Fixanol; dodecyl trimethyl ammonium bromide; stearyl trimethyl ammonium bromide, and a material commercially available under the trade name Soramine B. S. A., a product of the type specified in U. S. patent to Rein No. 2,149,709.

The term "foam" as here used refers to a dispersion of a gas in a liquid, in which the gas phase is surrounded by a very thin liquid phase generally of microscopic or sub-microscopic thinness, although continuous. Such a structure gives the foam its characteristic consistency or viscosity and stability. In an ordinary dispersion of gas bubbles in a liquid, the gas would simply rise to the surface and the life of the dispersion would be very short even if the liquid is viscous. The conditions favorable to the formation of any foam are first, low surface tension of the liquid, and second, the presence of foam stabilizing substances. These factors should be borne in mind in selecting the proper ingredients for the latex foam mixture according to my invention. Sometimes surface active substances which reduce the surface tension, also have foam stabilizing properties, but as a rule the two properties do not need to be present in one substance. For the reduction of surface tension, adsorption on the gas-liquid interface is necessary. For foam stabilizing, a film or membrane formation of the surface- adsorbed phase is essential.

The following examples of latex mixtures will serve to illustrate the results obtainable in producing latex foams respectively with one, and with both the "anionic" and "cationic long chain compounds." The invention is not intended to be confined to the use of these particular illustrative examples.

1. (a) 500 grams of centrifuged latex with 60% solid content were mixed with 30 grams of a 10% water solution of Igepon T. The mixture was beaten with a mechanical egg beater and it gave a foam of 1700 cc. volume after 30 minutes. This foam collapsed after 1 hour and 45 minutes.

(b) In addition to the above ingredients, 10 grams of a 5% water solution of stearyl trimethyl ammonium bromide were added, and after beating for 30 minutes, a foam of 1400 cc. volume resulted, which did not collapse after 9 hours of standing.

The latex employed in the above and subsequent examples, is an ammonia preserved latex. Instead of such ammonia preserved latex, I may employ other alkali preserved latex, such as that preserved with potassium hydroxide or sodium metasilicate.

2. (a) 500 grams of latex with 60% solid content was mixed with 50 grams of a 10% water solution of a material commercially available under the trade name of Igepol CA; a foam of 2800 cc. volume was obtained, which began to collapse 45 minutes after beating and which broke down entirely in 1 hour.

(b) To the same mixture 15 grams of 5% water solution of stearyl trimethyl ammonium bromide was added; a foam of 2800 cc. was formed which did not collapse after 10 hours.

3. (a) 500 grams of latex with 60% solid content obtained by centrifuging was taken and the following ingredients were added:

|  | Grams |
|---|---|
| 10% water solution of ammonium stearate | 50 |
| 10% water solution of sodium metasilicate | 10 |
| A 50% dispersion of zinc oxide (in a solution of 3% Darvan and 1% Nekal A) | 18 |
| A 50% dispersion of sulphur (in a solution of 3% Darvan and 1% Nekal A) | 9 |
| A 50% solution of Tepidone (sodiumdithiocarbonate) | 6 |

This mixture was subjected to beating with a mechanical egg beater for 20 minutes; a foam of 2500 cc. volume resulted, which became visibly coarser about 30 minutes after beating and collapsed in 3 hours. When rebeaten after collapse, no fine, dense froth could be again obtained.

(b) The same mixture was taken, except that before the addition of the ingredients, 10 grams of 10% Soramine B. S. A. were added. The foam did not collapse after 10 hours, although it became somewhat coarser. When rebeaten again the original consistency could be obtained, and could be kept as stable as the original foam.

The addition of about 10% of a substance available under the trade name Nekal BX to the ammonium stearate, improves the life and stability of the foam.

4. (a) 500 grams of the 60% latex may be mixed with 15 grams of a 10% water solution of sodium metasilicate, 30 grams of a 2% water solution of stearyl trimethyl ammonium bromide, together with the usual compounding ingredients such as 2% zinc oxide, 1% sulphur and 1% Tepidone. After beating for 30 minutes with an egg beater, no foam whatsoever is obtained.

(b) The same formula was used, but instead of stearyl trimethyl ammonium bromide, 50 grams of a 10% solution of ammonium stearate was added. A foam of 2000 cc. volume was obtained after 30 minutes of beating, which collapsed after 4 hours of standing. No trace of foam remained after 24 hours. A plate was dipped into the foam and after drying a rather coarse cellular deposit was obtained.

(c) Both the 30 grams of the 2% solution of stearyl trimethyl ammonium bromide and the 50 grams of the 10% solution of ammonium stearate were added to the mixture of the above Example 4(a). After 30 minutes of beating, a foam of 2400 cc. volume resulted, which was unchanged after 4 hours, and remained with an unchanged volume for 24 hours, although it became somewhat coarser.

The amounts of both the "anionic" and "cationic long chain compounds" may be varied to obtain the various desired properties in the foam as to density, setting time, etc. The optimum ratio between the anionic and cationic compounds for the desired purposes may be readily determined by trial. All of the above mixtures which were found satisfactory for the purpose, i. e., those containing both anionic and cationic long chain compounds, are found to have the property of being negatively charged (as determined by cataphoresis) and may be coagulated by acid. In each case the ratio between the anionic and cationic long chain compounds is such that no neutralization of the negative charge of the mixture will take place. In the examples given, no excess of the cationic long chain compounds above such ratio is used and no positively charged latex results. The latex mixture still being negatively charged, coagulation does not occur substantially in the mix, and the mix therefore provides a "reversible" foam.

The foams containing the "anionic" and "cationic compounds" as above described are ready for use with dipping processes in forming articles or coatings of fine foam rubber. For example, a form of the desired shape may be gradually and slowly immersed in the foam so as to not carry in and entrap air bubbles. Since these foams have the characteristics of a fluid, they will freely flow into good contact with all of the immersed areas of the form. Thereupon the form may be gradually and slowly withdrawn from the bath of liquid foam, preferably at a rate slow enough so that foam will not continue to run off the form after it is withdrawn. The form will now be encased in a layer of the foam of a thickness depending upon the consistency of the liquid foam and for example from $\frac{1}{32}$ inch up to as much as $\frac{1}{8}$ inch or more. In case a coating thicker than obtained by the first dipping is desired, then the first coating may be allowed to dry somewhat, as in a chamber heated to a temperature below vulcanization temperatures, and while the fine porous character of the coating is still maintained. As soon as the coating is sufficiently dried to withstand another dipping without displacement, then the form may be again dipped and dried. These dippings may be repeated until the coating or article is of the desired thickness, whereupon the form with the coating or laminations thereon may be heated at vulcanizing temperature. Thereafter the vulcanized rubber foam article may be stripped from the form. The form as initially dipped, if desired may already have thereon a dipped coating of solid latex, in which case a foam latex coating will adhere thereto and may be vulcanized therewith. In case prevulcanized latex is used in compounding the foam mixture, it will be merely necessary to thoroughly dry the dipped foam coating before it is stripped from the foam.

If at any stage it appears that the body of substantially liquid foam which is being used for dipping becomes coarser, then it may be rebeaten and readily restored to its original condition, and this step may be repeated as often as necessary. The bath should preferably be kept at a relatively low temperature, to prevent coagulation of the latex and aid in maintaining the foam, for example temperatures in the neighborhood of from 10° to 35° C. are satisfactory. Additional quantities of the foam may be added as desired and mixed with the previously partially used dip. That is, since the foam is "reversible," none of it has to be discarded from the dipping tank.

By the above described methods, one may obtain a finished foam rubber product having an extremely fine and exceptionally uniform cellular structure. For instance, in a typical sample, the largest cell found had a maximum dimension of about .019 inch, and more typical cells of the sample have a diameter of about .009 inch. The pores or cells are inter-communicating. On the "skin" surface of these samples the pores are scarcely discernible to the naked eye, the largest skin pore found having a diameter of about .006 inch, but most of the pores being smaller and of diameters between .001 and .003 inch. These pores are generally spaced apart by about .01 inch or more, and are generally quite separate and distinct from each other, in surface appearance, and rather uniformly distributed. The surface is very soft and smooth. The products made according to this invention being exceptionally fine and uniform, have in general a substantially greater tensile strength than froth or foam rubber products heretofore available. For instance typical samples of relatively thin foam coatings may be readily stretched up to about eight times their normal length without breaking or tearing. Such dipped foam coating open up wide fields of new uses for cellular rubber, and are well adapted for the manufacture by dipping, of a wide variety of articles of wearing apparel or for the coating by dipping of fabric materials.

While the invention has been described in detail with respect to particular preferred examples, it will be understood by those skilled in the art after understanding the invention that various changes and further modifications may be made without departing from the spirit and scope of the invention and it is intended therefore in the appended claims to cover all such changes and modifications.

What is claimed as new and desired to be secured by Letters Patent is:

1. Method of forming foamed rubber which comprises beating to a foam a sulphur-vulcanizable rubber latex mixture containing additions of both anionic- and cationic-long chain compounds, each containing at least six carbon atoms, said compounds being of a character and in proportion so that the resultant foam is capable of withstanding drying, is sufficiently fluid to be poured, and the composition is maintained negatively charged.

2. Method of forming foam rubber which comprises, creating a foam of a rubber latex vulcanizable by a chemical agent containing additions of both cationic- and anionic-long chain compounds, each containing at least six carbon atoms, in proportions such that the resulting latex is negatively charged and thereafter vulcanizing same.

3. Method of forming coatings of foam rubber which comprises beating to a foam, rubber latex vulcanizable by a chemical agent containing additions of both anionic- and cationic-long chain compounds, each containing at least six carbon atoms, in proportions such that the resulting latex is negatively charged, said additions being of a character to conjointly promote formation of reversible foam, applying such foam mixture to an article to be coated, and thereafter vulcanizing the resulting coating.

4. Method of forming foam rubber which comprises beating to a foam a rubber latex vulcanizable by a chemical agent containing additions of both anionic- and cationic-long chain compounds, each containing at least six carbon atoms, in proportions such that the resulting latex is negatively charged and the foam produced is reversible, capable of withstanding drying, and sufficiently fluid to be poured.

5. A composition for forming vulcanized foam rubber material comprising a foamed rubber latex vulcanizable by a chemical agent including both anionic- and cationic-long chain compounds, each containing at least six carbon atoms, in proportions such that the resulting latex is negatively charged, and of a character conjointly to promote foam formation.

6. A latex composition suitable for forming vulcanized foam rubber coatings on articles dipped therein, and comprising a sulphur-vulcanizable rubber latex foam including both anionic- and cationic-long chain compounds, each containing at least six carbon atoms, in proportions such that the resulting latex is negatively charged.

7. A sulphur-vulcanizable rubber latex foam mixture including foam-promoting anionic- and cationic-long chain compounds, each containing at least six carbon atoms, in proportions such that the resulting latex is negatively charged.

8. A substantially liquid reversible sulfur-vulcanizable rubber latex foam including vulcanizing and accelerating agents, and both anionic- and cationic-long chain compounds, each containing at least six carbon atoms, in proportions such that the resulting latex is negatively charged, of a character to conjointly promote foam formation.

9. A substantially uniformly fine cellular foam sulfur-vulcanizable rubber product formed from a composition containing such rubber latex embodying therein anionic- and cationic-long chain compounds, each containing at least six carbon atoms, in proportions such that they are capable of producing a negative charge in such latex.

10. Method of forming foam rubber which comprises beating to a foam, a sulfur-vulvanizable natural rubber latex mixture containing both an anionic-long chain compound and a cationic-long chain nitrogenous organic compound, each of said compounds containing at least six carbon atoms, in proportions such that the resulting latex is negatively charged and being of a character to conjointly promote formation of reversible foam.

11. Method of forming foam rubber which comprises beating to a foam, a sulfur-vulcanizable natural rubber latx mixture containing both an anionic-long chain compound and a cationic-long chain quaternary ammonium compound, each of said compounds containing at least six carbon atoms, in proportions such that the resulting latex is negatively charged and being of a character to conjointly promote formation of reversible foam.

12. Method of forming foam rubber which comprises beating to a foam, a sulfur-vulcanizable natural rubber latex mixture containing both an anionic-long chain soap and a cationic-long chain quaternary ammonium compound having a negative radical attached to the nitrogen atom, each of said compounds containing at least six carbon atoms, in proportions such that the resulting latex is negatively charged and being of a character to conjointly promote formation of reversible foam.

13. Method of forming foam rubber which comprises beating to a foam a sulfur-vulcanizable natural rubber latex mixture containing a soap having a hydrophilic head and a long hydrocarbon chain constituting an anion, together with a cationic compound consisting of a quaternary ammonium compound containing a long carbon chain of at least six carbon atoms, the long chain attached to the quaternary ammonium group constituting a positive group, the proportions of said soap and said quaternary ammonium compound being such that the resulting latex is negatively charged.

14. Method of forming foam rubber which comprises beating to a foam a sulfur-vulcanizable natural rubber latex mixture containing ammonium stearate and stearyl trimethyl ammonium bromide, the proportions of said soap and said stearyl trimethyl ammonium bromide being such that the resulting latex is negatively charged.

PAUL STAMBERGER.